(12) United States Patent
Büchler et al.

(10) Patent No.: US 10,596,656 B2
(45) Date of Patent: Mar. 24, 2020

(54) PRESSURE WELDING DEVICE AND PRESSURE WELDING METHOD

(71) Applicant: KUKA INDUSTRIES GMBH, Augsburg (DE)

(72) Inventors: Michael Büchler, Augsburg (DE); Otmar Fischer, Augsburg (DE)

(73) Assignee: KUKA INDUSTRIES GMBH, Augsburg (DE)

( * ) Notice: Subject to any disclaimer, the term of this patent is extended or adjusted under 35 U.S.C. 154(b) by 347 days.

(21) Appl. No.: 15/526,088

(22) PCT Filed: Nov. 12, 2015

(86) PCT No.: PCT/EP2015/076392
§ 371 (c)(1),
(2) Date: May 11, 2017

(87) PCT Pub. No.: WO2016/075218
PCT Pub. Date: May 19, 2016

(65) Prior Publication Data
US 2018/0290231 A1    Oct. 11, 2018

(30) Foreign Application Priority Data
Nov. 12, 2014   (DE) ............... 20 2014 105 432 U (51) Int. Cl.
*B23K 20/00*   (2006.01)
*B23K 20/12*   (2006.01)
(Continued)

(52) U.S. Cl.
CPC ............ *B23K 20/12* (2013.01); *B23K 9/08* (2013.01); *B23K 20/00* (2013.01); *B23K 20/02* (2013.01)

(58) Field of Classification Search
CPC ............ B23K 20/00; B23K 20/02–028; B23K 20/12–1215; B23K 9/08
(Continued)

(56) References Cited

U.S. PATENT DOCUMENTS 2,392,824 A  *  1/1946  Lytle ............... B23K 5/006
                                                228/196
3,065,536 A  *  11/1962 Chapman ......... B23K 20/028
                                                219/101

(Continued)

FOREIGN PATENT DOCUMENTS

DE        1958833 A1 *  6/1970  ......... B23K 20/1205
DE     198 49 225 C1     3/2000
(Continued)

Primary Examiner — Kiley S Stoner
(74) Attorney, Agent, or Firm — McGlew and Tuttle, P.C.

(57) ABSTRACT

A pressure welding device (1) includes a plastification device (7), an upsetting device (8) and a mounting (11) for the components (2,3) to be welded together and a machine frame (12). The pressure welding device further includes a machine head (13) and an upsetting head (27) which can be moved relative one another along a machine axis (6). The mounting (11) includes a component seat (36), which is mounted on the machine frame (12) so as to be able to float between the machine head (13) and the upsetting head (27), and a preferably automatic adjusting device (17) for adaptation to different component dimensions, in particular component lengths.

18 Claims, 7 Drawing Sheets

(51) Int. Cl.
  *B23K 9/08*   (2006.01)
  *B23K 20/02*  (2006.01)
(58) Field of Classification Search
  USPC ..... 228/115–116, 112.1–114.5, 233.1, 234.1, 228/235.1, 3.1, 2.1–2.3
  See application file for complete search history.

(56) References Cited

U.S. PATENT DOCUMENTS

| | | | | |
|---|---|---|---|---|
| 3,225,998 A * | 12/1965 | Bowman | ................ | B21D 41/04 228/15.1 |
| 3,235,157 A * | 2/1966 | Hollander | .............. | B23K 20/12 228/113 |
| 3,337,108 A * | 8/1967 | Taylor | .................. | B23K 20/121 228/2.3 |
| 3,414,963 A * | 12/1968 | Cheng | ..................... | C03C 27/02 156/73.1 |
| 3,439,853 A * | 4/1969 | Deemie | .................. | B23K 20/12 228/2.3 |
| 3,451,608 A * | 6/1969 | Deemie | .................. | B23K 20/12 228/2.3 |
| 3,464,616 A * | 9/1969 | Stamm | .................... | B23K 20/12 228/2.3 |
| 3,484,926 A * | 12/1969 | Blum | ..................... | B23K 20/12 228/113 |
| 3,542,383 A * | 11/1970 | Farley | .................... | B23B 31/207 269/49 |
| 3,544,120 A * | 12/1970 | Stamm | ................... | B23K 20/121 228/114.5 |
| 3,545,071 A * | 12/1970 | Oberle | ................... | B23K 20/12 156/73.5 |
| 3,571,905 A * | 3/1971 | Calton | .................. | B23K 20/129 228/113 |
| 3,680,760 A * | 8/1972 | Costa | .................... | B23K 20/121 228/2.3 |
| 3,691,622 A * | 9/1972 | Takagi | ................. | B23K 20/121 228/114.5 |
| 3,717,295 A * | 2/1973 | Woodall | ................ | B23K 20/12 228/2.3 |
| 3,731,959 A * | 5/1973 | Calton | ................ | B23K 20/129 403/271 |
| 3,838,807 A * | 10/1974 | Nomura | ................ | B23K 20/12 228/2.3 |
| 4,043,497 A * | 8/1977 | Jones | ..................... | B23K 20/12 228/2.3 |
| 4,060,190 A * | 11/1977 | Paolini | ................ | B23K 20/129 228/2.3 |
| 4,246,464 A * | 1/1981 | Altstetter | ................ | B23K 9/08 219/123 |
| 4,733,814 A * | 3/1988 | Penman | ................ | B23K 20/12 228/114.5 |
| 4,757,932 A * | 7/1988 | Benn | .................... | B23K 20/121 228/102 |
| 4,999,476 A * | 3/1991 | Kuchuk-Yatsenko | ... | B23K 9/08 219/123 |
| 5,201,894 A * | 4/1993 | Deal | ................. | B23B 31/16287 228/2.3 |
| 5,248,078 A * | 9/1993 | Deal | .................... | B23K 20/129 228/113 |
| 5,975,405 A * | 11/1999 | Tsuchiya | ................. | B23K 20/00 228/44.5 |
| 6,098,866 A * | 8/2000 | Tsuchiya | ............... | B23K 20/028 228/44.5 |
| 7,080,770 B2 * | 7/2006 | Lovin | .................... | B23K 20/12 228/102 |
| 8,960,524 B2 * | 2/2015 | Okuno | ................... | B23K 20/26 228/112.1 |
| 2004/0155092 A1 * | 8/2004 | Onuma | .................. | B23K 20/12 228/112.1 |
| 2004/0238594 A1 * | 12/2004 | Juranitch | ................. | B21D 3/10 228/29 |
| 2004/0256439 A1 * | 12/2004 | Pfeiler | .................... | B23K 20/12 228/112.1 |
| 2006/0043155 A1 * | 3/2006 | Lovin | .................... | B23K 20/12 228/102 |
| 2006/0196916 A1 * | 9/2006 | Goldstein | ................ | B23K 9/08 228/114.5 |
| 2007/0051776 A1 | 3/2007 | Estes et al. | | |
| 2009/0200356 A1 | 8/2009 | Kawaura et al. | | |
| 2010/0206861 A1 | 8/2010 | Rudolph et al. | | |
| 2011/0084547 A1 * | 4/2011 | Ehrlich | ................ | B60G 21/051 301/127 |
| 2013/0221070 A1 * | 8/2013 | Okuno | ................... | B23K 20/26 228/2.3 |
| 2015/0298249 A1 * | 10/2015 | Buchler | .................... | B23K 9/08 156/64 |
| 2016/0114437 A1 * | 4/2016 | Nijakowski | ........ | B23K 37/0435 228/104 |
| 2017/0144247 A1 * | 5/2017 | Kasler | .................... | B23K 20/02 |
| 2017/0304931 A1 * | 10/2017 | Buchler | ................. | B23K 20/02 |
| 2017/0304932 A1 * | 10/2017 | Buchler | ................. | B23K 9/08 |
| 2017/0326667 A1 * | 11/2017 | Buchler | ................. | B23K 9/08 |
| 2017/0348793 A1 * | 12/2017 | Buchler | ................. | B23K 20/02 |
| 2018/0036834 A1 * | 2/2018 | Menzinger | ............ | B23K 20/12 |

FOREIGN PATENT DOCUMENTS

| | | | |
|---|---|---|---|
| DE | 199 02 357 A1 | 8/2000 | |
| DE | 198 48 068 C2 | 2/2001 | |
| DE | 102 02 423 A1 | 8/2003 | |
| DE | 103 30 188 A1 | 2/2005 | |
| DE | 10 2004 010 386 A1 | 11/2005 | |
| DE | 20 2004 010386 U1 | 12/2005 | |
| DE | 10 2007 019588 A1 | 10/2008 | |
| DE | 10 2010 034 638 A1 | 9/2011 | |
| FR | 2672831 A1 * | 8/1992 | ............ B23K 20/12 |
| GB | 573052 A * | 11/1945 | ............ B23B 31/22 |
| GB | 963691 A * | 7/1964 | ............ B23K 20/12 |
| GB | 1392581 A * | 4/1975 | ............ B23K 20/12 |
| JP | 58058985 A * | 4/1983 | ............ B23K 20/12 |
| JP | 58058986 A * | 4/1983 | ............ B23K 20/12 |
| JP | 11151583 A * | 6/1999 | ............ B23K 20/12 |
| WO | 2005/002774 A1 | 1/2005 | |

* cited by examiner

PRESSURE WELDING DEVICE AND PRESSURE WELDING METHOD

CROSS REFERENCE TO RELATED APPLICATIONS

This application is a United States National Phase Application of International Application PCT/EP2015/076392, filed Nov. 12, 2015, and claims the benefit of priority under 35 U.S.C. § 119 of German Application 20 2014 105 432.4, filed Nov. 12, 2014, the entire contents of which are incorporated herein by reference.

FIELD OF THE INVENTION

The present invention pertains to a pressure welding device with a plasticization device and with an upsetting device as well as with a mounting for the components to be welded together and with a machine frame, wherein the pressure welding device has a machine head and an upsetting head, which are movable relative to one another along a machine axis and to a pressure welding method.

BACKGROUND OF THE INVENTION

Such a pressure welding device is known from DE 103 30 188 A1. It has a plasticization device and an upsetting device as well as a mounting for the components to be welded together and a machine frame. It further has a machine head and an upsetting head, which are movable along a machine axis relative to one another. The machine head is arranged stationarily at the machine frame. The upsetting head is configured as an upsetting punch, which is actuated by an upsetting drive arranged stationarily and supported at the other end of the machine frame. A manual and complicated modification is necessary for adaptation to different dimensions, especially to different component lengths.

SUMMARY OF THE INVENTION

An object of the present invention is to show an improved pressure welding technique.

The pressure welding technique according to the invention, i.e., the pressure welding device and the pressure welding method, have various advantages. They make it possible, on the one hand, to increase the performance capacity and the quality of the process during pressure welding. On the other hand, the degree of automation and hence also the economy can be improved. Set-up and downtimes can be largely avoided or at least reduced. In addition, ergonomics is improved.

The adjusting device according to the invention makes possible a simple and rapid adaptation of the pressure welding device to different component dimensions, especially component lengths. This adaptation pertains especially to the component mount arranged floatingly between the machine head and the head. It may take place automatically.

Further, the upsetting device with an upsetting drive, which is arranged between the machine head and the upsetting head and acts by pulling, is modified within the framework of an independent invention idea. This drive has two or more parallel drive units, e.g., cylinders, which are arranged along and on both sides next to the machine axis. The cylinder housings are preferably supported at the preferably stationary machine head, and the piston rods are permanently connected at their free ends to the upsetting head. The upsetting forces are transmitted as a result in a favorable manner in terms of kinking as pulling forces and are no longer transmitted as forces of pressure as in the state of the art.

Within the framework of the independent inventive idea, the pressure welding device has a plasticization device and an upsetting device as well as a mounting for the components to be welded together and a machine frame as well as a machine head and an upsetting head, which are movable along a machine axis in relation to one another, the upsetting device having an upsetting drive arranged between the machine head and the head and acting by pulling with two or more parallel drive units, which are arranged along and on both sides next to the machine axis.

The configuration and arrangement of the upsetting drive according to the invention makes, in addition, possible a flow of forces in a closed circuit and between the machine head and the upsetting head, which ensures improved support of forces and avoids undesired deformations as well as relieves the load on the machine frame. Due to the different vertical positions of the cylinders, especially of the piston rods thereof, the ergonomics and the accessibility at the operating area and on the operation side of the pressure welding device can be improved. In addition, the floatingly mounted component mount can additionally be guided at the piston rods via plain bearings.

The adjusting device has a controllable and longitudinally adjustable coupling device between the component mount and the upsetting head, which makes it possible to change the distance between the upsetting head and the component mount for said adaptation to different component dimensions. This adjustment can be carried out automatically with great rapidity and precision.

The upsetting drive and a travel motion of the upsetting head in relation to the component mount temporarily fixed on the machine frame, which motion is brought about by said upsetting drive, can be used for a coarse adjustment for adaptation to different length dimensions of different components. The coupling device, especially the locking of the coupling element, can be controlled and opened for this. The distance changed corresponding to the new component dimension is then fixed again.

Minor changes in the component dimensions can be compensated by means of a coupling adjuster of the coupling device. Such changes are caused, e.g., by insertion tolerances, component tolerances, especially length tolerances, an elastic shortening of a component during the pressure welding process or the like.

Optimization of the pressure welding process and optimal contacting of the components to be welded together and of the upsetting head are achieved with the adjusting device. This is also advantageous for the optimization of the process sequence, and especially for a programmed control of the plasticization and upsetting phases as well as of the feeds and component shortenings occurring in the process. Welded parts can be manufactured with very high precision as a result. This pertains to the quality of the welded connection, on the one hand, and to the constant length of the welded parts, on the other hand.

The pressure welding technique may have different configurations. On the one hand, an embodiment as a friction welding device and method is possible. The components are preferably aligned here along the machine axis and plasticized by friction on their front edges facing each other and connected to one another by a subsequent axial upsetting. As an alternative, pressure welding with rotatingly moving arc is possible. The rotation of the arc can be controlled by a drive device here.

Further advantageous additions may be made by additional components for the pressure welding device, especially the friction welding device.

This pertains, on the one hand, to an actuating device arranged in the drive train between the spindle drive and the spindle for a clamping device at the component mount of the machine stock or spindle stock. The driving torque can now be transmitted via the drive housing of an actuating device in an extensively deformation-free manner. It is thus also possible to transmit very high torques in conjunction with a clamping device actuation. On the other hand, a direct drive, in which the drive motor with its motor axis can be aligned essentially flush with the spindle axis, is possible hereby. Due to the separation of the actuating device from the drive motor, the latter may have any desired configuration. This makes possible the use of cost-effective standard motors.

Especially favorable is a configuration of the spindle drive as a direct drive, in which case the drive motor can be aligned with the drive train and the machine axis. The direct drive eliminates the need for the intermediate gear with a belt drive, which intermediate gear was hitherto common in many cases. The introduction of transverse forces to the drive train can be avoided. The susceptibility to wear is markedly reduced.

In addition, additional components, e.g., a multiple disk brake and a rotary coupling for compensating alignment errors, may be accommodated in the drive train.

Further, the use of a measuring device with a measuring shaft in the drive train is possible, as a result of which the process parameters can be controlled optimally and the control of the pressure welding process can also be carried out more precisely and better. The measuring device is of independent inventive significance. It may be used in any desired friction welding device and arranged at any desired location in the drive train. The friction welding devices may have any desired upsetting drives and spindle drives as well as stationary or displaceable machine heads and may also be configured as double-head or single-head machines.

Within the framework of the independent inventive idea, the pressure welding device has a plasticization device and an upsetting device as well as component mounts for the components to be welded together and a machine frame as well as a machine head with a rotatable output spindle for a component mount, wherein a measuring device with a measuring shaft for detecting the drive torque and possibly the drive speed is arranged in the drive train between the spindle drive and the spindle.

Further, a pressure welding device may have a machining device, especially a turn-off device.

The present invention is schematically shown in the drawings as an example.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Referring to the drawings, the present invention pertains to a pressure welding device (1) and to a pressure welding method.

The pressure welding device (1) and the pressure welding method may have various configurations. Common to the different variants are a plasticization device (7) and an upsetting device (8), with which the components (2, 3) to be welded together are melted and softened on the sides or edges facing one another and are subsequently upset, while forming the welded part (5). The upsetting device (8) has for this an upsetting drive (22) and an upsetting head (27), which acts on a component (3) with an upsetting stop (28).

The pressure welding device (1) further has a machine and process control (not shown), which is connected to the machine components described below and controls these. The machine and process control is connected, in addition, to the sensing, detection or measuring devices mentioned below and processes the signals thereof. It may be configured as a memory-programmable control and contain one or more process or sequence programs, a technology data bank, memories for programs and recorded process data, quality monitoring along with logging of the like.

The plasticization device (7) and the plasticization method may have different configurations. In the embodiment shown in FIGS. 1 through 5, the pressure welding device (1) is configured as a friction welding device, where the plasticization device (7) has a friction device (9).

Figure 6:
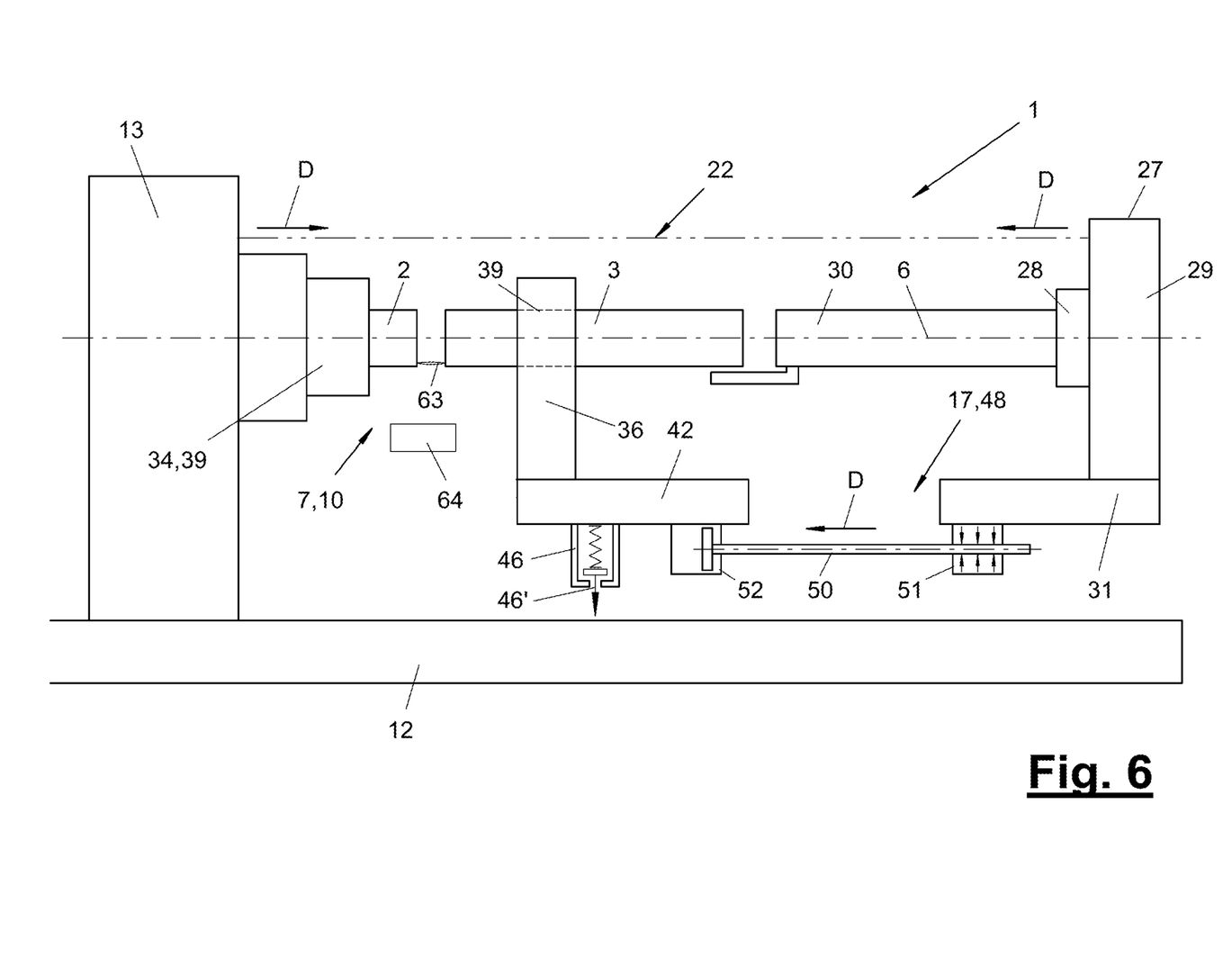
FIG. 6 is a schematic view of an adjusting device for adaptation to different component dimensions as well as a schematic view of a modified pressure welding technique with rotatingly moved arc.

FIG. 6 indicates a variant in which the edges of the components are heated and melted with an arc (63), which is moved rotatingly along the circumference of the component with magnetic force by means of a drive device (64). Further details will be explained below.

In the different variants, the pressure welding device (1) has a machine frame (12) with a longitudinal or machine axis (6) and a mounting (11) for components (2, 3) to be welded together. The machine frame (12) has a floormounted machine bed, on which the components of the pressure welding device (1), which will be explained below, are arranged. Further, an operating material supply unit (19) is present. It makes available the operating materials needed, especially electric current, hydraulic fluid, compressed air, lubricant and coolant or the like and routes these to the respective consumers.

The pressure welding device (1) has an enclosing, protective housing (21) with a closable access on the operating side (20). Here, a worker, a robot or the like can feed the components (2, 3) to be joined and remove the finished welded part (5).

The pressure welding of the components (2, 3) takes place in the direction of the machine axis (6), along which the components (2, 3) are also aligned. The components (2, 3) are now plasticized on the front sides or edges facing each other, especially by rotary friction or by the rotating arc (63), as well as upset along the machine axis (6). The machine axis (6) forms the process axis for the plasticization and upsetting.

The components (2, 3) may consist of various materials. Metallic materials, especially steel, light metal alloys, cast alloys or the like are preferably used. The material pairings may be different. Especially iron-containing materials with nonferrous metals can thus be joined. In addition, nonmetallic materials, e.g., ceramic materials, can be welded, especially in conjunction with another metallic component.

The pressure welding device (1) further has a machine head (13) with a component mount (34) and with said upsetting head (27), which are mounted movably in relation to one another along the machine axis (6). The machine head (13) is arranged and supported stationarily at the machine frame (12) in the exemplary embodiments shown, and the upsetting head (27) is arranged at the machine frame (12) displaceably along the machine axis (6).

The kinematics may alternatively be reversed, in which case the machine head (13) is arranged displaceably and the upsetting head (27) stationarily. Both may be displaceable in another variant.

The upsetting head (27) has, e.g., a yoke-shaped configuration and has a carrier (31) with a support (29), at which the upsetting stop (28) is arranged and the upsetting drive (22) is connected. The carrier (31) is configured, e.g., as a slide and is guided and mounted on the machine bed (12) via a guide (32), e.g., over bilateral axial guide rails. The upsetting head (27) further has a detection device (33) for its position and for the travel path.

The detection device (33) may be configured, e.g., as a path-measuring device. This may be associated with the guide (32). For example, a measuring rail may be arranged here on the machine bed (12) and a measuring head at the upsetting head (27), especially at the carrier (31). The path-measuring device may measure in any desired and suitable manner, e.g., optically, inductively or capacitively. The path measurement may be relative or absolute.

The mounting (11) for the components (2, 3) further has a component mount (36) mounted moveably at the machine frame (12) between the machine head (13) and the upsetting head (27). It is used to receive the second component (3) and is also called central mount.

The component mount or central mount (36) likewise has a carrier (42), especially in the form of a slide, which is mounted and guided displaceably in the direction of the machine axis (6) on the machine frame (12). It may be arranged with the upsetting head (27) one after another on a common guide (32).

The component mount (36) may be fixed when needed at the machine bed (12), especially at the guide (32), by clamping or in another manner by means of a controllable fixing device (46). The component mount (36) likewise has a detection device (47) for detecting the position and/or path along the machine axis (6). The detection devices (33, 47) may have identical configuration and use a common measuring rail.

The component mounts (34, 36) can receive the component (2, 3) in question in any desired and suitable manner. They preferably have for this a remotely controllable clamping device (39) each with adjustable clamping elements (40) and an actuating device (41). The clamping device (39) may be configured as a chuck, optionally with a one-step or multistep configuration, or as a self-centering chuck or in another manner.

The upsetting head (27) acts on the component (3) with the upsetting stop (28) from behind in the direction of the machine axis (6), and this may happen by means of a direct contact or via the intermediary of an upsetting rod (30).

The upsetting device (8) acts in the exemplary embodiments shown between the machine head (13) and the upsetting head (27) and generates pulling forces (13) in the direction of the machine axis (6). The upsetting device (8) has an upsetting drive (22), which is arranged between the machine head (13) and the upsetting head (27) and is connected to both. The upsetting drive (22) acts by pulling and pulls the components (13, 27) towards one another. This is indicated by arrows D in the schematic view in FIG. 6.

The upsetting drive (22) may have various configurations. In the exemplary embodiments shown, it has two or more parallel drive units (23, 24), which are aligned along the machine axis (6). The drive units (23, 24) are arranged on different sides of the machine axis (6), especially on both sides and mutually diametrically opposed in relation to the machine axis (6). The drive units are preferably configured as cylinders.

As an alternative, the drive units (23, 24) may be configured in a different manner, e.g., as electric rod or spindle drives. The arrangements and embodiments explained below in connection with the cylinders (23, 24) shown correspondingly also apply to other embodiments of drive units.

The cylinders (23, 24) are preferably configured as hydraulic cylinders. They have an extensible piston rod (26) and a cylinder housing (25) each. The cylinder housings (25) are preferably mounted and supported at the machine head (13). The free ends of the extensible piston rods (26) are fastened to the upsetting head (27). The drive housing (25) and the extensible drive element (26), e.g., a toothed rack or a threaded spindle, may be arranged and connected correspondingly in other drive units.

Figure 2:
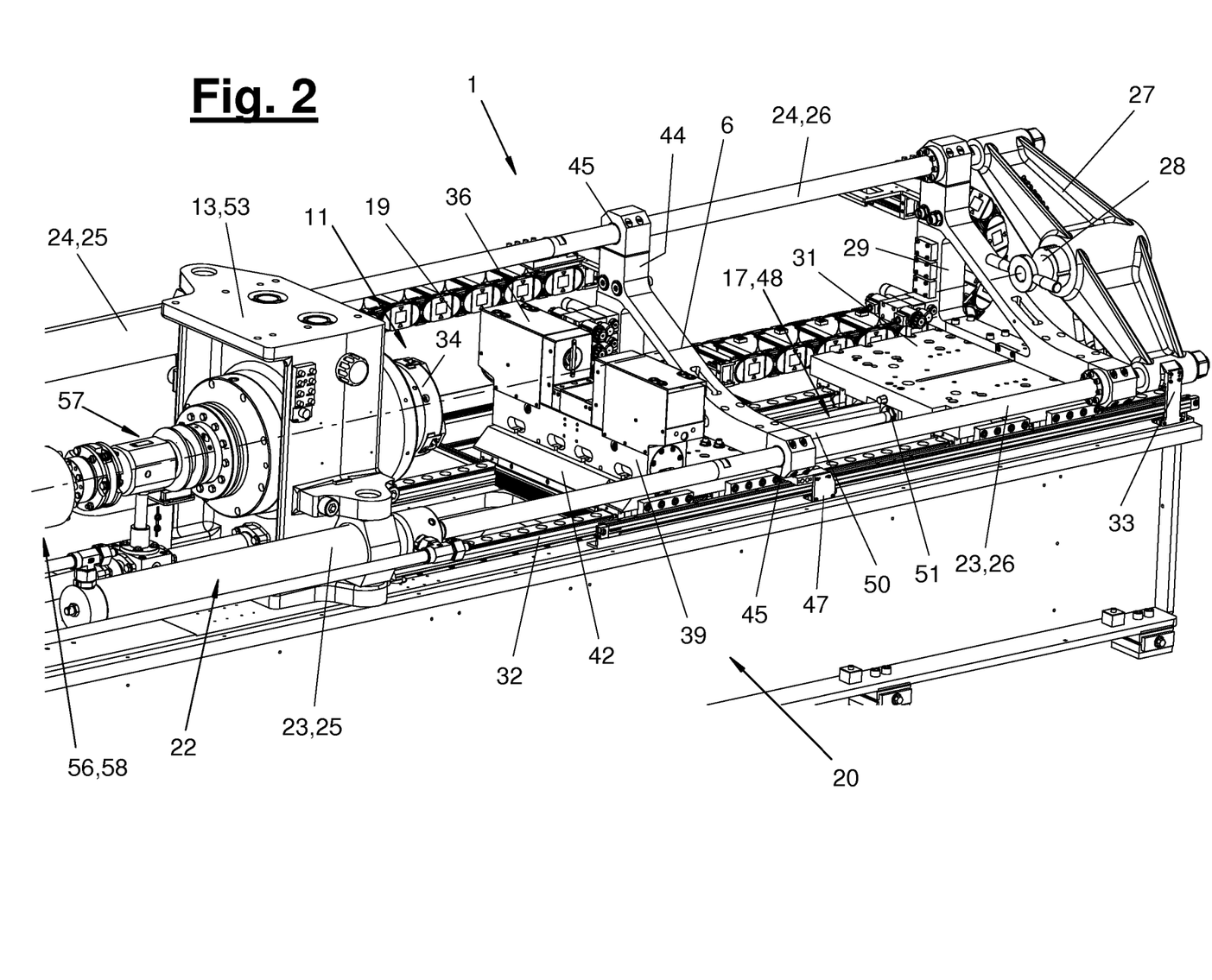
FIG. 2 is a perspective detail views of the pressure welding device from FIG. 1.
Figure 3:
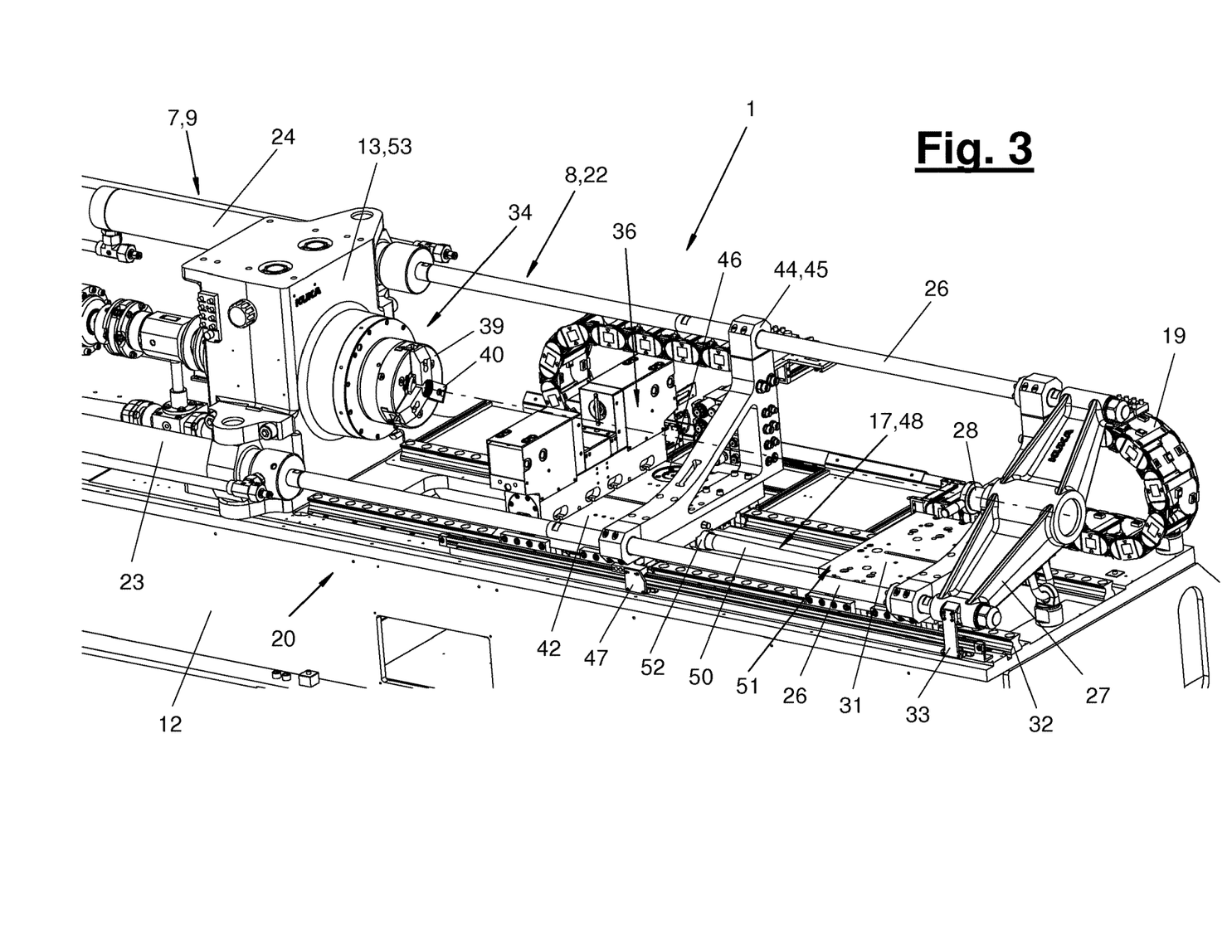
FIG. 3 is another perspective detail views of the pressure welding device from FIG. 1.
Figure 4:
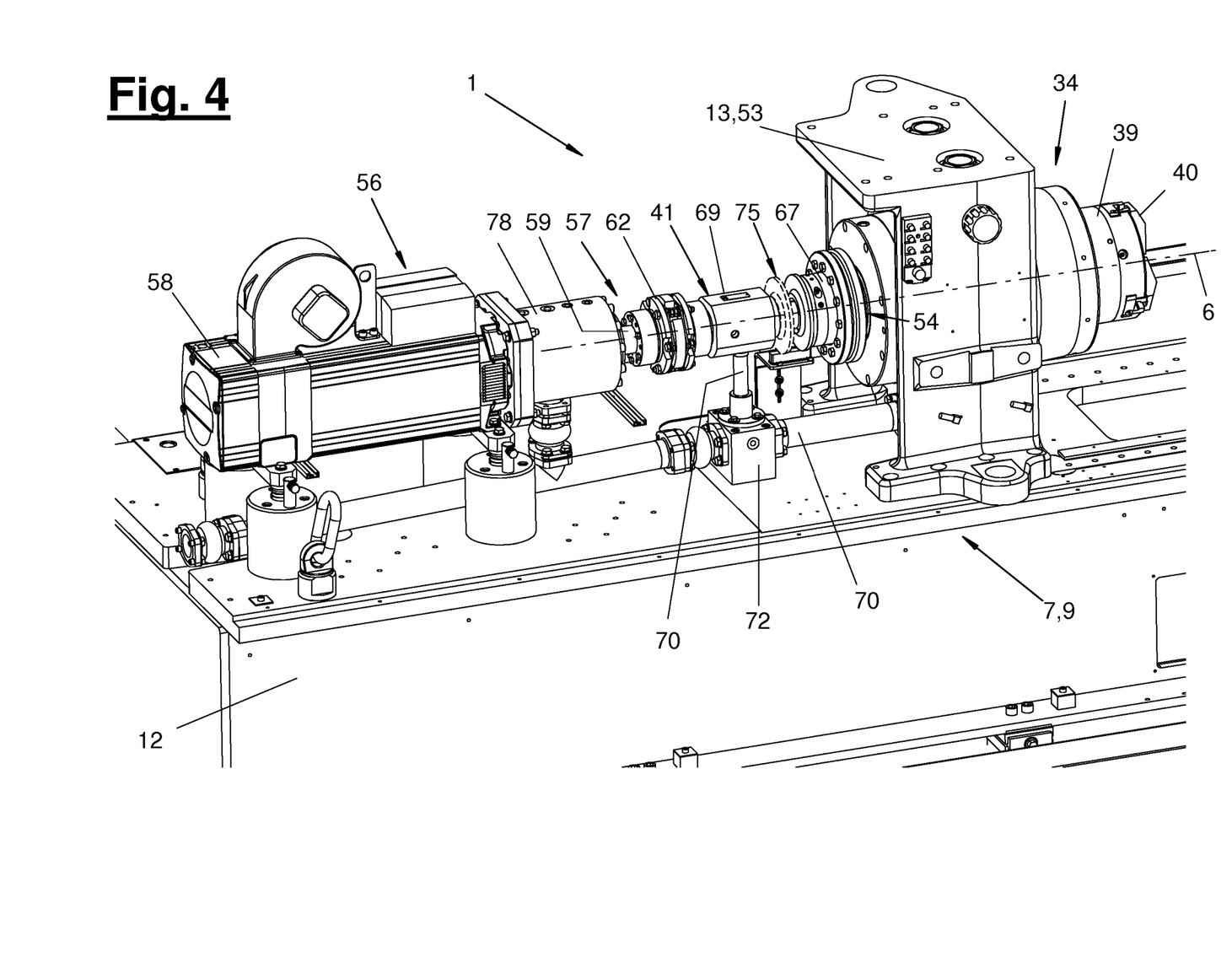
FIG. 4 is a perspective detail view of an addition to the pressure welding device with an actuating device for a chuck and with a direct motor drive.

As is illustrated especially in FIGS. 2 and 3, the upsetting head (27) has a connection yoke between the piston rod ends, at which the upsetting stop (28) is also arranged. The support (29) is arranged in front of the yoke and is likewise permanently connected, especially clamped, to the piston rods (26). The support (29) is connected to the carrier or slide (31) and is especially placed on this. The yoke floats above the carrier and is connected to this via the piston rod (26) and the support (29). The yoke is guided via this at the machine frame or machine bed (12) along the machine axis (6).

The central component mount (36) can likewise be connected to the upsetting drive (22), especially to the piston rods (26). A support (44), which is connected to the piston rods (26) via plain bearing (45), is fastened for this on the carrier or slide (42). This makes possible an additional guiding along the machine axis (6). This configuration also offers guiding and supporting for the upsetting drive (22), especially the piston rod (26).

The drive elements, especially cylinders (23, 24), are arranged at different levels above the machine bed (12) in the shown embodiments of the upsetting drive (22). The cylinder (23) located adjacent to the operating area or operating side (20) is arranged in a low position and just barely above the top side of the machine bed (12). As a result, it does not hinder the access of the worker to the component mounts (34, 36). The other, opposite cylinder (24) is arranged on the other side of the machine head (13) and in a higher position above the machine bed (12). The different vertical positions of the cylinders (23, 24) and of the piston rods thereof lead to an oblique position of the yoke at the upsetting head (27). Further, the supports (29, 44) also have a correspondingly bent shape and different vertical positions of the plain bearings (45) as well as of the fixing or clamping points at the piston rods (26). The bent shape of the support does, on the other hand, offer sufficient free space for the components (2, 3).

The pressure welding device (1) has an adjusting device (17) each in the different embodiments for adaptation to different component dimensions, especially component lengths. The adjusting device (17) preferably operates automatically. The adaptation is preferably brought about by adjusting the central component mount (36).

The adjusting device (17) has controllable and variable-length coupling device (48) between the central component mount (36) and the upsetting head (27). The coupling device (48) ensures a connection of the components (36, 27) in the direction of the machine axis (6) and is preferably connected to the carriers (31, 42) thereof. The distance between the component mount (36) and the upsetting head (27) can be changed and, if needed, adapted in the direction of the machine axis (6) with the adjusting device (17) and especially the coupling device (48) thereof in the manner described below.

The coupling device (48) has a coupling element (50), which is arranged between the component mount (36) and the upsetting head (27) and is adjustably connected to both. The coupling element (50) is configured, e.g., as a coupling rod arranged as a single rod or as a plurality of rods and preferably extends along the machine axis (6). The coupling device (48) further has a locking device (51) and a coupling adjuster (52).

The coupling element (50), especially the coupling rod, is received longitudinally movably and with a controllable clamping at an end area at the locking device (51). The locking device (51) is arranged, e.g., at the upsetting head (27), especially at the carrier (31) thereof. The locking device (51) may be configured, e.g., as a controllable rod clamping. With the clamping opened, the coupling element (50) can be axially displaced relative to the locking device (51) and said distance can be changed hereby.

At the other end area, the coupling element (50) is connected to the coupling adjuster (52). The coupling adjuster (52) is arranged, e.g., at the component mount (36), especially at the carrier (42) thereof. The coupling device (48) is preferably arranged under the carrier (31, 42) and is located in a free space on the top side of the machine bed (12). The coupling adjuster (52) has a drive, with which it can adjust the coupling element (50) as needed along the machine axis (6) or block it in the existing position.

The coupling adjuster (52) or the drive can, in addition, yield elastically, e.g., in the manner of a hydraulic spring, and generate a certain opposing force or damping in the process within the framework of the aforementioned adjustment upon the action of external forces in case of a corresponding connection.

The coupling adjuster (52) or the drive is configured, e.g., as a hydraulic block cylinder. The aforementioned configuration and arrangement of the coupling device (48) is schematically shown in FIG. 6. The above-mentioned fixing device (46), which can be integrated in the adjusting device (17), can also be seen here. The fixing device (46) has, e.g., an elastically prestressed clamping in a direction (46') against the guide (32), which can be released hydraulically.

Figures 7, 8, 9, 10:
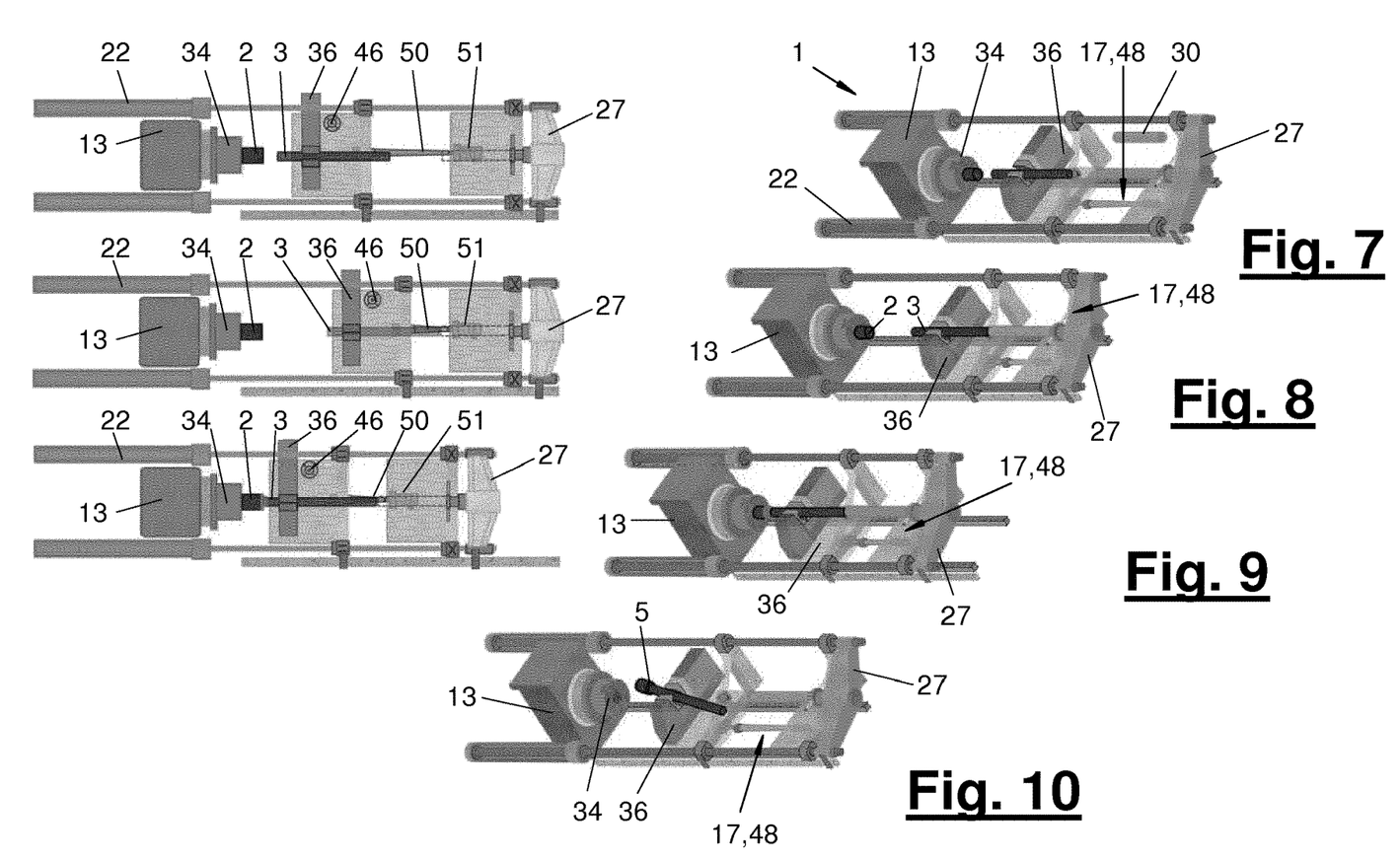
FIG. 7 is a view of one of a plurality of operating steps of an operating sequence of the adjusting device.
FIG. 8 is a view of another of a plurality of operating steps of an operating sequence of the adjusting device.
FIG. 9 is a view of another of a plurality of operating steps of an operating sequence of the adjusting device.
FIG. 10 is a view of another of a plurality of operating steps of an operating sequence of the adjusting device.

FIGS. 7 through 10 show different operating steps and operating positions during the operation of the adjusting device (17). The views on the left-hand sides of FIGS. 7 through 9 show top views and those on the right-hand side show perspective views of the pressure welding device (1).

FIG. 7 shows the embodiment in which a worker has inserted the components (2, 3) to be welded together into the component mounts (34, 36).

When changing over from one of the components (2, 3) to another, and the components (2, 3) now have different dimensions, especially different lengths, automatic length adaptation of the pressure welding device (1) can be performed with the adjusting device (17). The length adaptation can be carried out without a component (3) inserted.

The locking device (51) is opened for this and the upsetting head (27) with the upsetting drive (22) is moved towards the central component mount (36) or away from same. The starting positions of the component mount (36) and of the upsetting head (27) as well as the travel path of the upsetting head (27) are detected by means of the detection devices (33, 47). The travel motion of the upsetting head (27) is stopped at the location calculated and preset by the machine and process control from the difference in the lengths of the components. The locking device (51) is closed again at the time of stop. The distance between the upsetting head (27) and the component mount (36) is thus reset. Automatic length adaptations take place due to this relative travel motion in case of a change between components in which dimensions are relevant.

As an alternative, the length adaptation may be carried out with a component (3) inserted, in which case the travel motion of the upsetting head (27) is stopped on contact between the component (3) with the upsetting stop (28) or when an upsetting rod (30) is possibly inserted. The contact may be detected in any desired and suitable manner, e.g., based on an increase in force at the upsetting drive (22).

FIG. 8 shows the other possibility of adjusting the adjusting device (17), which makes possible a compensation of insertion or component tolerances as well as possible process-related elastic deformations of the component (3) received by the coupling adjuster (52) and the shortening of the distance. The component (3) is first inserted for this at the component mount (36), in which case a distance may develop from the upsetting stop (28) or the upsetting rod (30). With the locking device (51) closed, the coupling adjuster (52) is then actuated and it moves the component mount (36) in the direction of the upsetting head (27) being held stationarily, while the distance becomes shorter, until the contact takes place between the component (3) and the upsetting stop (28) or the upsetting rod (30) and is detected in a suitable manner.

The adjusting force of the coupling adjuster (52) can be maintained, and a further motion of the coupling element (50) is at first prevented by said contact of the component. Should an elastic shortening of the component (3) occur at the component mount (36) during the pressure welding process under the upsetting force, the distance between the upsetting head (27) and the component mount (36) can be correspondingly adapted by the coupling adjuster (52).

The pressure welding process starts after performing the automatic length adaptation and after recording insertion and component tolerances, and the upsetting drive (22) moves the upsetting head (27) in the axial direction to the machine head (13). The coupling device (48) is blocked now, so that the upsetting head (27) carries the component mount (36) via the coupling element (50) and brings the components (2, 3) into direct contact, which is, in turn, detected in a suitable manner. The plasticization process then starts.

The components (2, 3) are pressed together axially by the upsetting drive (22) under a controllable or regulatable force during friction welding, and the component (2) being held in the component mount (34) is rotated about the machine axis (6). The edges of the components are melted at the connection site by the frictional heat. The upsetting stroke is then performed by the upsetting drive (22). Shortening of the components takes place during the friction and upsetting, and a friction bead is formed at the connection site of the components (2, 3). FIG. 9 shows this friction welding process.

FIG. 10 shows the next position, in which the upsetting drive (22) moves back the upsetting head (27), carrying along the coupled component mount (36). The component mount(s) (34, 36) is/are opened now. The welded part (5) can then be removed and new components (2, 3) can be inserted.

If welding is carried out according to FIG. 6 with a magnetically moved arc (63), the components (2, 3) are first brought into contact with one another in the above-mentioned manner by the motion of the upsetting head (27) and then spaced apart somewhat again, and the arc is ignited between the adjacent component edges. The arc device (10) has a power source (not shown) for this, which ensures the necessary voltage. The arc (63) can then be driven rotatingly by means of a drive device (64), e.g., a coil array, and it now rotates about the machine axis (6). After sufficient plasticization of the component edges, the voltage is switched off and the upsetting stroke is initiated to connect the components (2, 3).

A friction welding device (1) with a friction device (9) and with additional machine components is shown in the exemplary embodiments shown in FIGS. 1 through 5.

The friction device (9) has a rotatable shaft (54), which will hereinafter be called spindle, with a component mount (34) arranged on the front side; a headstock (53) and a friction drive (56), especially spindle drive. The headstock (53) contains the mount guide and support of the spindle (54) and is arranged and supported at the machine head (13). The spindle (54) and the output shaft (59) of the spindle drive (56) are connected to one another by a drive train (57) such that they rotate in unison.

The spindle drive (56) is configured as a direct drive in the embodiment being shown. It has a drive motor (58), whose motor shaft (59) is aligned essentially flush with the longitudinal axis of the spindle (54) and with the machine axis (6). The drive train (57) is also likewise aligned along the machine axis (6). The motor shaft (59) is coupled via a coupling (62) with the spindle (54) or with an actuating device (41) described below for the component mount (34). The coupling (62) is configured as a flexurally elastic coupling rotating in unison. It can possibly compensate alignment errors, especially lateral offset and/or oblique position.

Additional components may be arranged in the drive train (57) between the friction drive (56), especially the spindle drive, and the spindle. These may include, e.g., a controllable brake (78) shown in FIG. 4, which may be configured as a hydraulic multiple disk brake or as a simpler motor-stopping brake. Regenerative braking of the spindle drive (56) is also possible.

In a variant of the exemplary embodiments shown, the drive motor may be arranged laterally offset from the spindle (54) as well as from the machine axis (6) and drive the spindle (54) via an intermediate gear, especially a belt drive.

In another variant, the friction or spindle drive (56) may have a disk flywheel arrangement (not shown). The disk flywheels are set into rotation by the drive motor (58) about the machine axis (6) and then bring about an inertia drive for the spindle (54), and a controllable brake (78) can control or regulate the speed of rotation in the drive train (57) and possibly also stop the rotation. The disk flywheel arrangement can be separated from the drive motor (58) and possibly from the spindle (54) by means of a coupling.

FIGS. 1 through 5 show, in addition, an embodiment of the pressure welding device (1), in which an actuating device (41) for the clamping device (39) is arranged at the component mount (34) in the drive train (57) between the spindle drive (56) and the spindle (54). The actuating drive (65) is preferably arranged co-rotatingly in the drive train (57). The drive motor (58) may again be provided as a direct drive and aligned flush with the machine and spindle axis (6), which leads to advantages concerning the free selection of the motor and the economy resulting therefrom.

Figure 1:
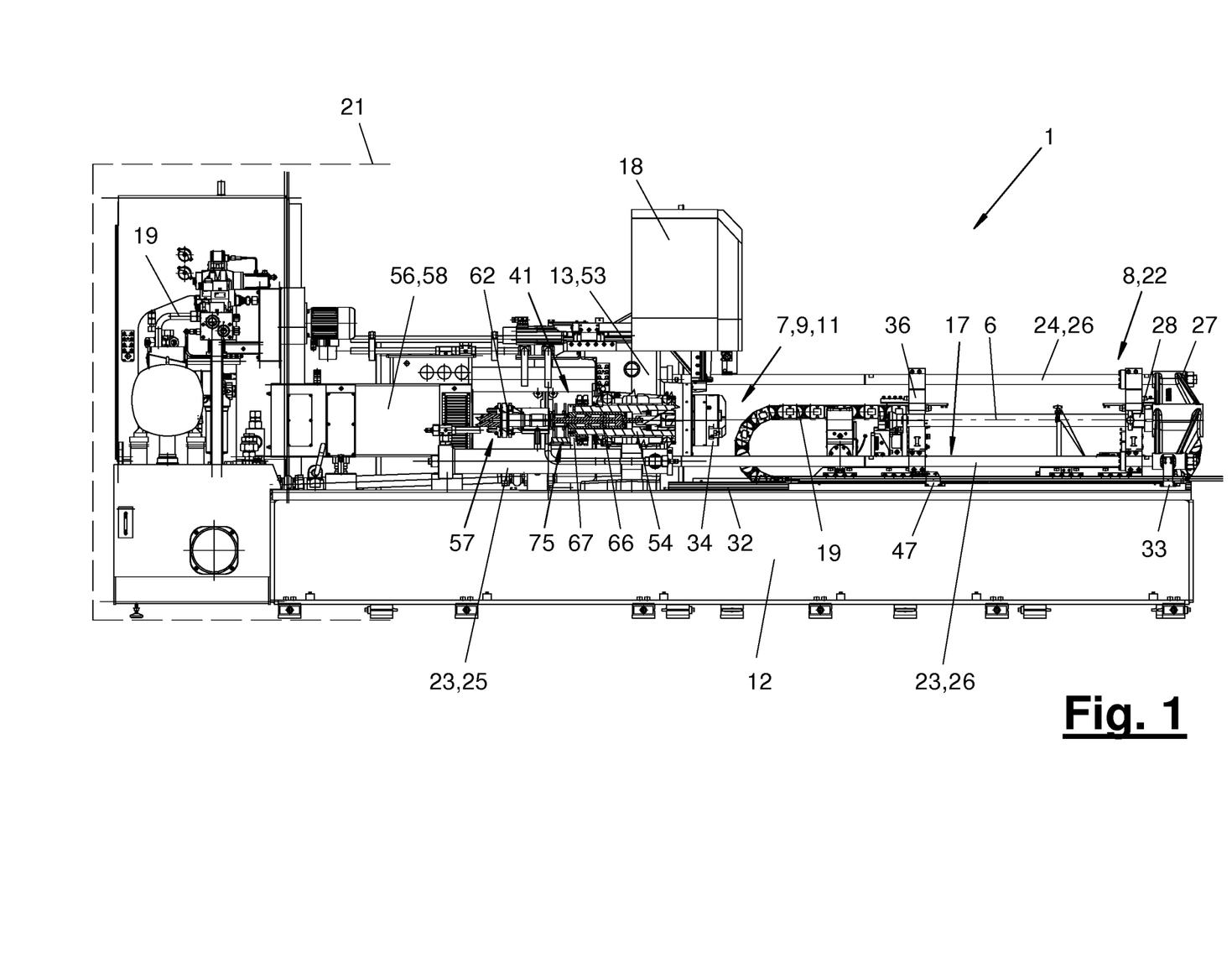
FIG. 1 is a partially cut-away side view of a pressure welding device.

The actuating device (41) has an actuating drive (65) with a output element (66) indicated in FIG. 1, which is passed through the interior space of the hollow spindle (54) and acts, e.g., on the adjusting element of the clamping elements (40) by an axial motion. The adjusting motion can be detected and controlled or regulated with a measuring device. The actuating drive (65), which is, e.g., a hydraulic or electric drive, has a jacket-shaped drive housing (67), which is connected nonrotatingly to the motor shaft (59), on the one hand, and to the jacket of the hollow spindle (54), on the other hand, and transmits the drive torque of the spindle drive (65) in a deformation- and loss-free manner.

The actuating device (41) further has a rotary feed device (69) for supplying operating materials, e.g., hydraulic fluid or electric current from the outside to the actuating drive (65) rotating with the spindle (54). A connection is arranged for this for a flexible tube, not shown, or a cable on a stationary feed housing of the rotary feed device (69). Further, external lines (70) for removing overflow oil as well as a connection head (72), which may also have a support function for the rotary feed device (69) at the same time, are provided. Internal lines to the output elements (66) possibly arranged in the spindle (54), e.g., a piston arrangement, may be laid in the interior space or in the jacket of the spindle (54).

The operating material supply unit (19) has a pump assembly and a valve arrangement for supplying and connecting the hydraulic actuating drive (65) and the output elements (66) thereof in case of a hydraulic actuating drive (65). A power source and a switching device are present in case of an electrical actuating drive (65).

Figure 5:
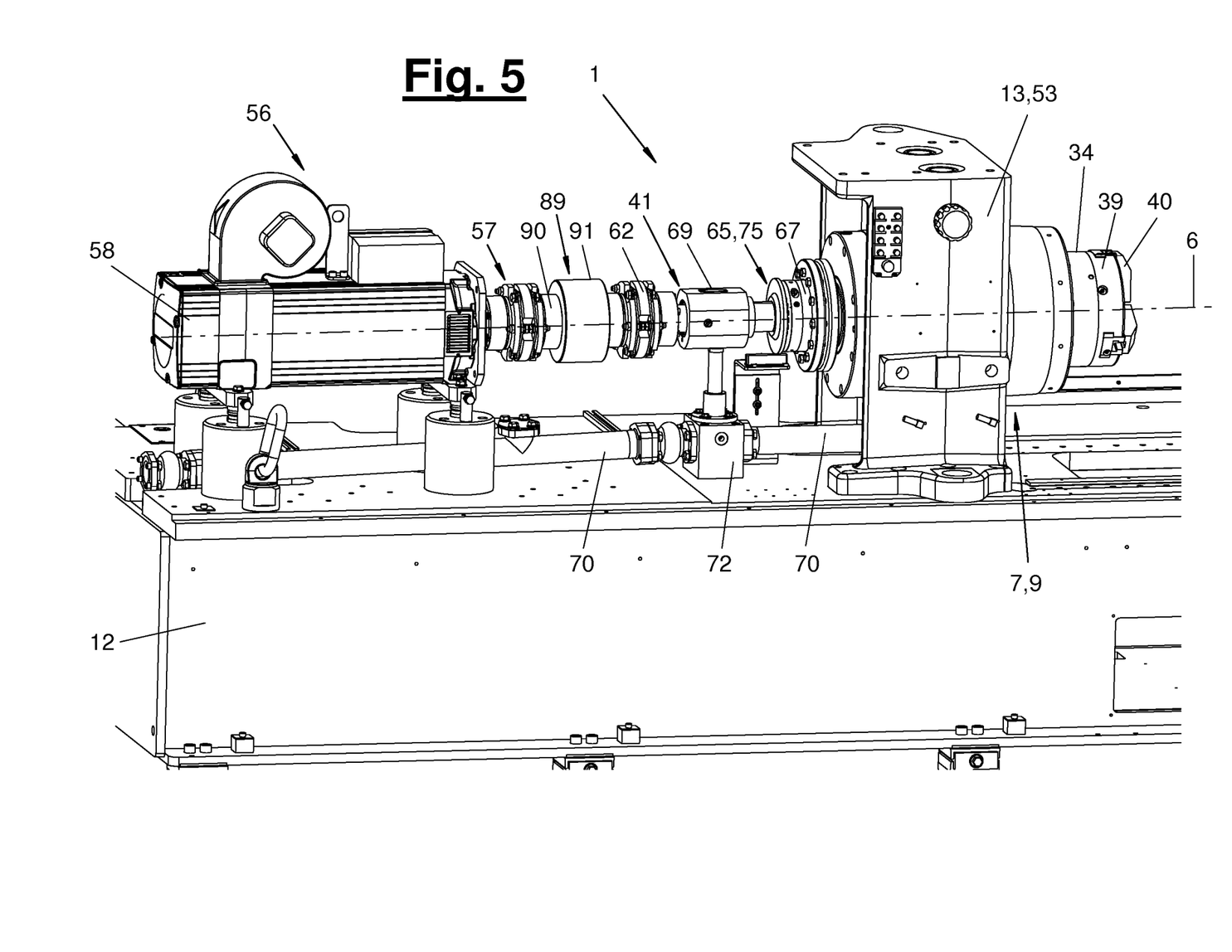
FIG. 5 is another perspective detail view of an addition to the pressure welding device with an actuating device for a chuck and with a direct motor drive.

FIG. 5 shows, in addition, an embodiment in which a measuring device (89) for detecting the drive torque and possibly the drive speed is arranged in the drive train (57) between the spindle drive (56) and the spindle (54). The measuring device (89) may be inserted between the motor shaft (59) and the spindle (54) or the actuating device (41).

The measuring device (89) has a measuring shaft (90) rotating in a co-rotatingly coupled manner in the drive train (57). This shaft may have any desired configuration in terms of design and measuring technique. Optimal data logging is preferably performed. The measuring shaft (90) may be arranged at any desired location in the drive train (57).

In the exemplary embodiment shown, the measuring shaft (90) has a shaft body with a central measuring housing (91), which encloses the shaft and is preferably arranged stationarily. The shaft body projects from the measuring housing (91) on both sides and is connecting nonrotatingly to the drive shaft (59) and the spindle (54) or possibly the actuating device (41) by means of couplings (62).

The measuring shaft (90) has one or more co-rotating measuring elements on the shaft body for detecting torsional stresses, which are detected and possibly analyzed by a detection device in the measuring housing (91). The measured and analysis information is sent to the machine and process control. The measuring elements may be configured, e.g., as incremental ring disks, which are connected to the shaft nonrotatingly and at an axial distance, and which signal a torsion of the shaft. As an alternative, the measuring elements may be configured as wire strain gauges or in another manner. The measuring device (89) shown may be configured, e.g., according to DE 198 48 068 C2 or DE 10 2010 034 638 A1 or DE 198 49 225 C1.

The shaft (59) may have a split configuration, and the measuring shaft (90) is inserted between the shaft halves. As an alternative, the drive or motor shaft (59) may be provided with suitable measuring elements and form the measuring shaft (90).

FIG. 1 shows, in addition, the arrangement of a machining device (18) for the welded part (5) or for one or more components (2, 3) before and/or during the welding. The machining device (18) is configured, e.g., as a turn-off device for the weld bead on the welded part (5). In addition, it may face the front sides of one or both components (2, 3) prior to the welding.

The welded part (5) can be rotated for such a machining by the component mount (34) or by the spindle drive (56). The clamping device (39) of the central component mount (36) can open in this case. A component support (38), which is schematically shown in FIG. 6 and is configured, e.g., as a steady rest with rollers and supports the rotating welded part (5), may be arranged at the component mount (36), especially on the carrier (42) thereof.

Different variants of the exemplary embodiments shown and described are possible. In particular, the features of the different exemplary embodiments may be combined with and also replaced by one another as described. The upsetting drive (22) may have a conventional configuration, e.g., according to the state of the art described in the introduction. It may be arranged on the outer side at the upsetting head (27) and/or possibly at the machine head (13) and apply forces of pressure from the outside. The upsetting head (27) may be modified correspondingly.

While specific embodiments of the invention have been shown and described in detail to illustrate the application of the principles of the invention, it will be understood that the invention may be embodied otherwise without departing from such principles.

The invention claimed is:

1. A pressure welding device with a plasticization device and with an upsetting device, the pressure welding device comprising:
   a mounting for the components to be welded together;
   a machine frame;
   a machine head;
   an upsetting head wherein the machine head and the upsetting head are movable relative to one another along a machine axis, the mounting has a component mount mounted moveably at the machine frame between the machine head and the upsetting head; and
   an adjusting device for adaptation to different component dimensions, including component length, wherein the upsetting device comprises an upsetting drive with two or more parallel drive units, which are arranged extending along a machine axis on both sides of the machine axis, and said upsetting drive is arranged between the machine head and the upsetting head and acts by pulling, wherein the adjusting device comprises a controllable and variable-length coupling device between the component mount and the upsetting head.

2. A pressure welding device in accordance with claim 1, wherein the drive units are arranged at different levels above the machine frame with one of the drive units located closer to an operating area of the pressure welding device and arranged in a lower location than an opposite, other drive unit.

3. A pressure welding device in accordance with claim 1, wherein the coupling device has a coupling element arranged between the component mount and the upsetting head and connected adjustably on both sides, the coupling element comprising a coupling rod, and the coupling device further comprising a locking device and with a coupling adjuster.

4. A pressure welding device in accordance with claim 3, wherein the coupling element is received at an end area at the locking device in a longitudinally movable manner and with a controllable clamping and the coupling element is connected at the other end area to the coupling adjuster, wherein the coupling adjuster has a drive comprising a block cylinder that adjusts or blocks the coupling element along the machine axis as needed.

5. A pressure welding device in accordance with claim 3, wherein with the locking device opened, the adjusting device performs an automatic length adaptation for different components by a relative motion brought about by the upsetting drive and a change in the distance between the component mount and the upsetting head.

6. A pressure welding device in accordance with claim 3, wherein the locking device is arranged at the upsetting head and the coupling adjuster is arranged at the component mount.

7. A pressure welding device in accordance with claim 1, wherein the component mount has a switchable fixing device for temporary fixing at the machine frame.

8. A pressure welding device in accordance with claim 1, wherein the machine head is arranged stationarily and the upsetting head is arranged axially displaceably at the machine frame.

9. A pressure welding device in accordance with claim 1, wherein the component mount has a carrier mounted axially displaceably at the machine frame with a clamping device for the component.

10. A pressure welding device in accordance with claim 1, wherein
   the drive units are configured as hydraulic cylinders; and
   the component mount has a support with bearings for piston rods of the hydraulic cylinders.

11. A pressure welding device in accordance with claim 1, wherein the upsetting head has a carrier mounted axially displaceably at the machine frame with an upsetting stop.

12. A pressure welding device in accordance with claim 1, wherein the pressure welding device is configured as a friction welding device, wherein the plasticization device has a friction device.

13. A pressure welding device in accordance with claim 1, wherein the pressure welding device is configured as a welding device with a magnetically moved arc, wherein the plasticization device has an arc device.

14. A method for pressure welding components with a pressure welding device, which has a plasticization device and an upsetting device as well as a mounting for the components to be welded together and a machine frame, wherein the pressure welding device has a machine head and an upsetting head, the method comprising the steps of:

moving the a machine head and an upsetting head relative to one another along a machine axis;

providing the mounting with a component mount mounted moveably at the machine frame between the machine head and the upsetting head; and     adapting the pressure welding device to different component dimensions, including component length, with an adjusting device, wherein the upsetting device comprises an upsetting drive with two or more parallel drive units, which are arranged extending along a machine axis on both sides of the machine axis, and said upsetting drive is arranged between the machine head and the upsetting head and acts by pulling wherein the distance between the upsetting head and the component mount is changed by a controllable and variable-length coupling device.

15. A method in accordance with claim 14, wherein the distance between the upsetting head and the component mount is changed for the adaptation to different component dimensions.

16. A method in accordance with claim 14, wherein for an adjustment for adaptation to different length dimensions of different components, the upsetting head is displaced by the upsetting drive in relation to the component mount temporarily fixed at the machine frame.

17. A method in accordance with claim 14, wherein changes in the component dimensions are compensated by a coupling adjuster of the coupling device.

18. A method in accordance with claim 14, wherein the components to be welded together are plasticized on their front edges facing each other by friction or by a rotatingly moved arc.

\* \* \* \* \*